Nov. 28, 1950 — G. VAN VOORST — 2,532,131
TAMALE FORMING MACHINE
Filed Feb. 3, 1947 — 2 Sheets-Sheet 1
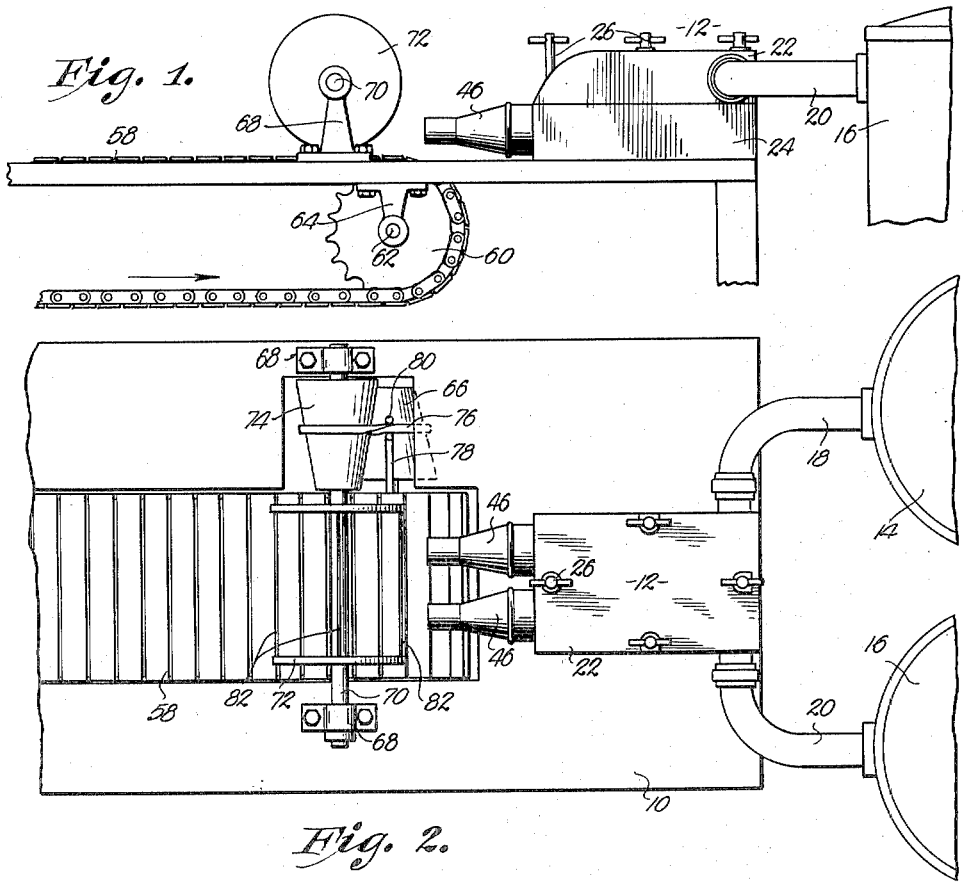
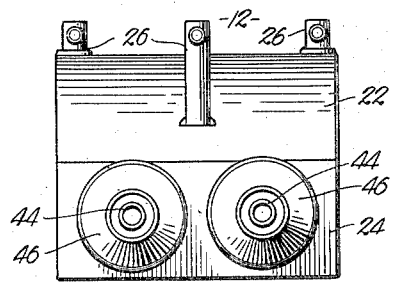
Inventor
George Van Voorst
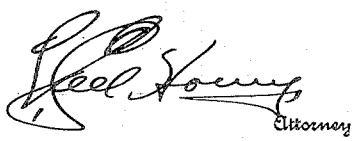
Attorney Nov. 28, 1950 G. VAN VOORST 2,532,131
TAMALE FORMING MACHINE
Filed Feb. 3, 1947 2 Sheets-Sheet 2

Inventor
George Van Voorst

Attorney

Patented Nov. 28, 1950

2,532,131

UNITED STATES PATENT OFFICE 2,532,131

TAMALE FORMING MACHINE

George Van Voorst, Kansas City, Mo., assignor to Rutherford Food Corporation, Kansas City, Mo.

Application February 3, 1947, Serial No. 726,183

2 Claims. (Cl. 107—1)

This invention has to do with apparatus for forming a food product of the well known type commonly called "tamales," and the primary object is to provide a tamale forming machine having a unique head formed to receive separately certain of the ingredients of the tamale and moving the same toward a conveyor therefor in a condition where one of said ingredients completely circumscribes another of the ingredients as the same emanate from the head.

It is well known in the field of tamale making that the preferable method of making the same is to encircle the meat ingredients thereof with a continuous coating of mush. The tamale thus formed is subsequently wrapped in paper or the like and canned or otherwise stored for future disposal. The means for automatically disposing of such ingredients in relatively telescoping relation presents one of the most difficult problems in this field and it is, therefore, the most important object of this invention to provide a machine which will most efficiently perform such operation.

One of the most important objects of this invention is the provision of a tamale forming machine having a head provided with a number of passages therethrough for separately receiving the ingredients of the tamale as the same is forced therethrough under pressure, which passages terminate at the outlet ends thereof respectively in a pair of telescoping nozzles, the innermost nozzle being of a smaller diameter than the outermost nozzle to the end that as the ingredients emanate therefor, one of such ingredients will completely circumscribe the other of such ingredients.

A further object of this invention is to provide a tamale forming machine having reservoirs for separately housing the ingredients for the tamale, which reservoirs are in communication with the aforesaid head, and which machine has an endless conveyor disposed to receive the strips of ingredients from the head and move the same to a position where successive steps may be performed.

A still further object of this invention is to provide a tamale forming machine having the aforesaid conveyor as a part thereof, and an unique cutting assembly formed by a rotatable drum provided with a plurality of spaced apart cutters thereon, to the end that as the strips of ingredients emerge from the head, the same are cut into desired lengths for subsequent canning.

Other objects of this invention include the way in which the aforesaid passages formed in the head are disposed so that one of the passages circumscribes the nozzle of the other passage near its outlet end; the way in which the nozzles are formed and disposed to assure automatic formation of the strips of ingredients prior to discharge therefrom; and the unique way in which the head is formed to the end that the same may be completely disassembled and easily kept in a clean condition as desired.

Other objects of this invention will be made clear or become apparent throughout the course of the following specification, reference being had to the accompanying drawing, wherein:

Fig. 1 is a fragmentary side elevational view of a tamale forming machine made in accordance with my present invention.

Fig. 2 is a fragmentary top plan view thereof.

Fig. 3 is an end elevational view of the head showing the same entirely removed from the machine per se.

Figure 4:
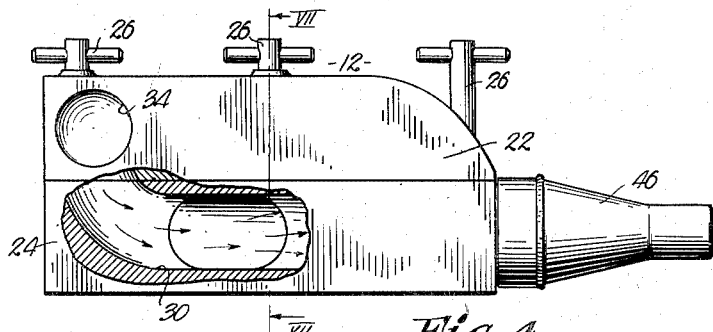
Fig. 4 is a side elevational view of the head, parts being broken away to reveal details of construction.

It is well understood that tamales are made having ingredients of a highly varied nature but generally the same include a corn meal mush, meats formed from beef, beef fat, pork, etc., wheat flour, spices, flavoring and many other substances as desired. The tamale is usually sold as a finished product with the corn meal mush circumscribing the meat ingredients thereof and the machine about to be described is designed to handle such ingredients and form the same to present such relative telescoping or circumscribing relationship between such ingredients.

In the drawings, the numeral 10 designates a table of any suitable form or style which carries a head broadly designated by the numeral 12. This head 12 is in communication with a pair of reservoirs 14 and 16 for storing the meat and the mush ingredients respectively of the tamale to be formed. Such communication is established by a pair of conduits 18 and 20 respectively.

Figure 5:
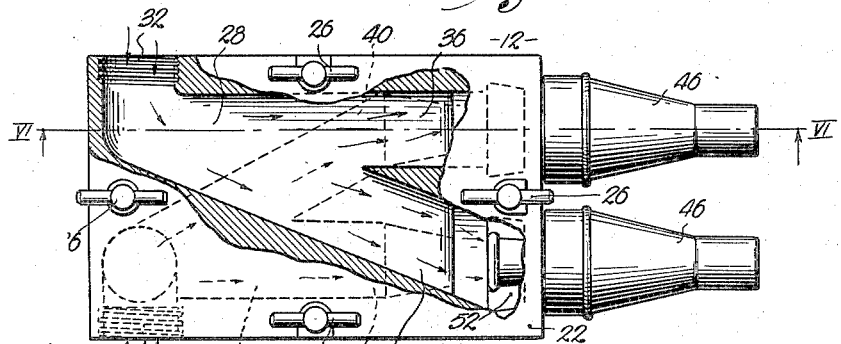
Fig. 5 is a top plan view of the head, parts being broken away for clearness.
Figure 6:
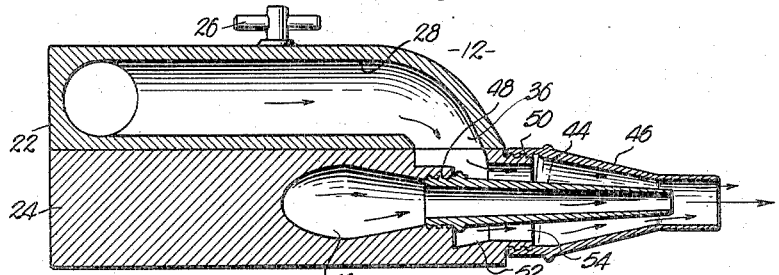
Fig. 6 is a cross sectional view taken on line VI—VI of Fig. 5.
Figure 7:
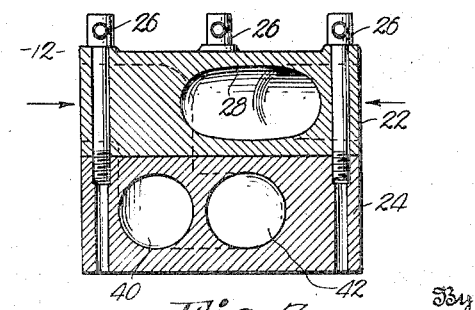
Fig. 7 is a cross sectional view taken on line VII—VII of Fig. 4.
Figure 8:
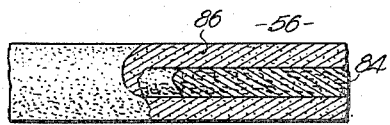
Fig. 8 is a side elevational view of a tamale formed by the machine, parts being broken away to reveal the circumscribing relation of one of the ingredients to the other.

As clearly illustrated, particularly in Figs. 4 to 7 inclusive, this head 12 is sectional and the top and bottom sections 22 and 24 respectively thereof, are held together by a plurality of bolts or the like 26. A pair of passages 28 and 30 having inlet ends 32 and 34 respectively are formed in these sections 22 and 24 of head 12, which inlet ends 32 and 34 are in direct communication with the conduits 20 and 18 respectively illustrated in Fig. 2.

In the form of head 12 chosen for illustration, two strips of the combined ingredients are simultaneously formed and to this end each of the passages 28 and 30 have branches extending from a substantially central point therein toward their outlet ends respectively. Passage 28 includes branches 36 and 38, while the passage 30 has a pair of branches 40 and 42. The outlet ends of each of the branches 40 and 42 are provided with a nozzle 44, while the outlet ends of each of the branches 36 and 38 are provided with a somewhat larger nozzle 46. Nozzle 44 has external threads 48 thereon for securing the same in registering relation with the respective branch 40 or 42 of passage 30, and this nozzle 44 extends outwardly a distance beyond the outermost end of the head 12.

A threaded outwardly projecting boss 50 is formed on the section 24 of head 12 for receiving the internal threads of nozzle 46. This nozzle 46 is therefore in telescoping relation with nozzle 44 and extends outwardly a distance beyond the outermost end of nozzle 44. The branches 36 and 38 of passage 28 circumscribe the nozzle 44 to present a space 52 therearound and the outlet end 54 of these branches 36 and 38 are also in encircling relation with the nozzle 44 to the end that a continuous passage for the mush entering inlet opening 32 of passage 28 is established through head 12 and thence through the nozzle 46. The meat ingredient for the tamale 56 moves from container 14 through conduit 18, thence into opening 34 of passage 30, branches 36 and 38, through nozzles 44 where this meat merges with the mush passing through nozzle 46, all as illustrated by the arrows in Figs. 4, 5 and 6.

As the strips of ingredients pass outwardly from nozzles 44 and 46, the same are deposited upon an endless conveyor 58, having suitable driving means at one end thereof (not shown) and passing over a pair of sprocket wheels 60. These sprockets 60 are mounted upon a shaft 62 supported by bearings 64 depending from the top of table 10 and this shaft 62 extends beyond the conveyor 58 for receiving a frusto-conical pulley 66.

A pair of bearing supports 68 extend upwardly from the table 10 and carry a shaft 70. A cutter drum 72 is mounted upon this shaft 70 directly upon the conveyor 58 and the outermost end of shaft 70 has a second frusto-conical pulley 74 fixed thereto. A belt or the like 76, circumscribes these pulleys 66 and 74 and the same is held in operative position by an arm 78 extending outwardly from table 10.

This arm 78 has a pair of fingers 80 on one end thereof embracing the belt 76 and this arm is adjustably secured to the table 10 in any suitable manner not shown, to the end that the speed of rotation of the cutter drum 72 may be varied by moving the belt 76 inwardly or outwardly from the conveyor 58 as desired.

The cutter drum 72 is provided with a plurality of spaced apart cutters 82 which preferably comprise a number of tightly stretched wires or the like. It is clear therefore, that as the ingredients emanate from the head 12, conveyor 58 will cause the same to move outwardly therefrom and the knives 82 of drum 72 will cut the tamales 56 in such lengths as governed by the speed of rotation of shaft 70 and the cutter drum 72 carried thereby. The direction of rotation of drum 72 is indicated by the arrow illustrated in Fig. 1 and this is established by twisting the belt 76 as shown in Fig. 2.

Obviously, the meat and mush within the reservoirs 14 and 16 respectively, are forced therefrom and through the head 12 under pressure and as the same pass from nozzles 44 and 46 respectively, the tamale 56 will have the meat ingredients 84 entirely covered and encircled by the mush ingredients 86 thereof. As the cut tamales 56 move along conveyor 58, the same may be wrapped and packed in any suitable manner, not illustrated or described, since this step in the operation forms no part of the present invention.

The detailed description of the construction and the relative arrangement of the parts embraced in the present invention are for the purpose of imparting a full, clear and exact understanding of the same. It is understood, therefore, that changes or modifications may be made in practice and which fairly fall within the scope of my invention as defined by the appended claims.

Having thus described the invention, what is claimed as new and desired to be secured by Letters Patent is:

1. In a tamale forming machine of the character described, a head having a pair of releasably joined sections each having an inlet opening and a plurality of outlet openings formed therein, one of the sections having a passage interconnecting its inlet and outlet openings, the other section having a cavity joining each outlet opening respectively thereof with a corresponding outlet opening of said one section when the sections are joined, said other section having a passage registering at one end thereof with its inlet opening and provided with a branch aligned with each of said outlet openings respectively of the other section; and a tubular spout registering with each branch respectively, said spouts extending telescopically through a corresponding outlet opening of the other section in spaced relationship to the walls of the other section forming the outlet openings thereof.

2. In a tamale forming machine, a head having a pair of inlet openings and a pair of outlet openings; an elongated tubular nozzle connected with the body in communication with each outlet opening respectively; a substantially Y-shaped passage formed in the body having a stem in register with one inlet opening and a leg in register with each outlet opening respectively; an elongated tubular spout connected with the body and telescoped within each outlet opening and the corresponding nozzle respectively and in spaced relationship to the walls thereof, each spout intersecting a respective branch of said passage; and a second substantially Y-shaped passage formed in the body, having a stem in register with the other inlet opening and a leg in register with each spout respectively.

GEORGE VAN VOORST.

REFERENCES CITED

The following references are of record in the file of this patent:

UNITED STATES PATENTS

| Number | Name | Date |
|---|---|---|
| 797,276 | Glauser | Aug. 15, 1905 |
| 1,759,928 | Allen | May 27, 1930 |
| 2,125,729 | Kretchmer | Aug. 2, 1938 |
| 2,199,825 | Kretchmer | May 7, 1940 |
| 2,303,351 | Gage et al. | Dec. 1, 1942 |
| 2,371,225 | Curry | Mar. 13, 1945 |